SPURIOUS CONTOUR REDUCTION SYSTEM

Filed Dec. 15, 1955

INVENTOR.
WILLIAM F. SCHREIBER
BY Lyon & Lyon
ATTORNEYS

United States Patent Office 2,916,549

Patented Dec. 8, 1959

2,916,549

SPURIOUS CONTOUR REDUCTION SYSTEM

William F. Schreiber, North Hollywood, Calif., assignor to Technicolor Corporation, Hollywood, Calif., a corporation of Maine Application December 15, 1955, Serial No. 553,278

8 Claims. (Cl. 178—7.5)

This invention relates to pulse-code-modulation television systems and, more particularly, to an improvement therein.

In an article in the Bell System Technical Journal for January 1951, which is entitled Television by Pulse-Code Modulation, by W. M. Goodall, there is described a television system employing pulse-code modulation in the transmission of the television picture. In this system, the brightness levels of a scene, which is viewed by a television camera, are quantized. By this is meant that a range of brightness levels is established which are the only levels to be transmitted. For example, fifteen different levels may be established. Each point of a picture is made to fall within one of those fifteen different levels. Each one of these levels is given a binary number. What is transmitted from the television station is a succession of binary numbers corresponding to the brightness levels of the various picture elements. At the receiver there is provided decoding apparatus which establishes a signal whose amplitude corresponds to the binary number. These signals, inturn, can then be applied to the brightness grid of the television tube, and, thus, the picture being transmitted may be reproduced at the receiver.

It is a known phenomenon that when a video signal is transmitted by a pulse-code-modulation system, such as is briefly described above, and a relatively small number of quantized brightness steps are used, there are spurious contours noticeable in the reproduced picture. These contours arise in areas of the original scene in which the brightness has a low gradient, so that several adjacent elementary areas have the same code (in other words, the adjacent elemental areas are less than one quantizing step apart in brightness), this group of areas being followed by another group having a code one step higher, etc. In the reproduced picture, the first group of elementary areas is given one brightness level, the second group the next-higher brightness level, and so forth, so that at the boundary between groups there results an unwanted contour corresponding to no real detail in the original scene. This effect is most noticeable in sky areas, or on faces in closeup scenes.

This effect can be somewhat minimized by using a great many brightness steps. However, this serves to complicate the equipment and waste bandwidth. Thus, the benefits of using pulse-code modulation are negatived. Another attempt at minimization can be made by adding noise to the signal before encoding. This has the effect of smearing out the spurious contours, but it also succeeds in creating an undesirable reduction in sharpness of the picture.

An object of this invention is to provide a novel circuit arrangement for substantially eliminating spurious contours in a pulse-code-modulation television-transmission system.

Another object of the present invention is to provide circuitry for substantially eliminating spurious contours without requiring any increase in the bandwidth of transmission in a pulse-code-modulation television-transmission system.

Still another object of the present invention is to provide a novel, simple, and inexpensive circuit arrangement for minimizing spurious contours in a pulse-code-modulation television-transmission system.

Yet another object of the present invention is the provision of an arrangement for reducing visible noise in a television receiver.

These and other objects of the invention are achieved by providing circuitry in a pulse-code-modulation television receiver which derives information from decoded video signals from which it is enabled to predict whether some particular signal transmission is a true or false one. This is done by making the following assumptions: If a change in a decoded signal is small, on the order of one or two brightness levels, it is probably a false change, since it is unlikely that a perceptible detail of the picture should differ from its background by such a small amount. On the other hand, if a signal transition is large, say on the order of five or more brightness levels, then it is extremely unlikely that this is a false change, and so it should be reproduced sharply. The circuitry of this invention also takes advantage of the phenomenon that the perception of detail of a viewer is lower at low brightness, so that the bandwidth of the low-pass filter may also be controlled by the picture-brightness level, being lower at low brightness and higher at high brightness.

The circuitry in the embodiment of the invention includes means to derive a control signal from changes in brightness level of the decoded television signal and means to derive a second control signal from the brightness level of the decoded television signal, as well as when the change in brightness level is less than a predetermined amount, a variable low-pass filter is controlled by these control signals to lower the pass frequency at the high-frequency end of the filter. The output of the filter is applied to the reproducing kinescope to control the brightness of the signal being reproduced thereon. In a second embodiment of the invention, the control signals are applied to the focusing electrode of the kinescope to also defocus the electron beam. In both embodiments of the invention, the reduced bandwidth of the low-pass filter prevents brightness changes from passing therethrough and being reproduced on the kinescope.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

The embodiment of the invention to be described is in the form of apparatus which is included in a receiver for pulse-code-modulation signals. This is not to be construed as a limitation, since, as shown later herein, the embodiment of the invention can be used in the regular television receiver. These embodiments employ the decoded-pulse-modulation signal which the receiver produces from the received signals for application to the brightness grid of the reproducing kinescope of the receiver. The embodiment of the invention is interposed between the kinescope brightness grid and the decoding portion of the receiver, which converts the numbers received from the transmitter into brightness levels. Thus, referring now to Figure 1, a rectangle 10, labeled decoder, represents the decoding portion of a pulse-code modulation receiver. The output from this decoder is the quantized video signals of the type denoted by the wave shapes 30 in Figure 2.

Figure 2:
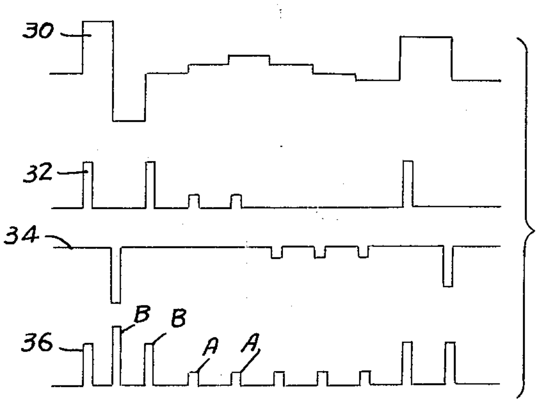
Figure 2 is a series of wave-shape diagrams which are shown to assist in an understanding of the invention.

These signals are applied to a first differentiating and clipping network 12, the output of which is applied to a pulse-stretching network 14. The output of the pulse-stretching network 14 is represented by the wave shapes 32 in Figure 2. The output from the decoder is also applied through an inverter stage 16 to a second differentiating and clipping network 18. The output of this second network 18 is applied to a pulse-stretching network 20. The output of the pulse-stretching network is represented by the wave shapes 34 as shown in Figure 2. Thus, wave shapes 32 and 34 respectively correspond to the positive- and negative-going transitions of the decoded video signal. These are combined in an adder 22 to produce a combined signal having the wave shape 36.

The output of the adder is applied through a delay network 24 to an adder 25. The video signal output of the decoder 10 is applied through another delay network 28 to the input to a variable low-pass filter 26 and to the adder 25 to be combined with the control signals derived from the adder 22. The output of the adder 25 is applied to the bandwidth-control input of the variable low-pass filter 26.

In accordance with the theory of the invention previously presented for small values of the control signal as represented by 36A in the wave shape 36, the pass band of the variable low-pass filter is narrowed. These small control-signal values are derived from or correspond to brightness-level changes of only one or two increments (or any other desired small change). The large control signals, represented by 36B, correspond to brightness-level changes in excess of the small changes. These large control signals widen the pass band of the variable low-pass filter. An additional control effect is derived from the decoded video signal, since, when this signal, itself, is large, denoting a high-brightness level, the variable bandpass filter has a wide bandwidth and the control effect of the decoded video signal diminishes with a decrease in its level to the point where the control signals derived from change in brightness levels are the main controlling factors.

The theory behind the operation of the embodiment of the invention is that rapid changes in brightness, and, thus, in the video signal, require a large bandwidth in order that these changes be communicated without restriction to the reproducing kinescope. These changes are minimized by restricting the pass bandwidth of the low-pass filter whenever such changes are less than a predetermined level in the manner described above. Thus, for large changes in brightness level, the low-pass filter is opened to its maximum. For small changes in brightness level, the low-pass filter has its upper frequency depressed. Thus, the bandwidth required to pass the change in brightness level is not present. However, it is to be noted that the signal level which is applied to the low-pass filter will be maintained. Thus, even though the changes in the signal level are not passed, the signal level itself remains substantially constant, even though the bandwidth of the low-pass filter is depressed.

As a result of the operation of the embodiment of the invention spurious contours, as detected from low brightness-level changes, are substantially smeared out and thus rendered inobvious, and true detail is essentially unaffected.

The purpose for inserting the two delay networks 24, 28 is to equalize the delays occurring through the apparatus so that the control signal applied to the variable bandpass filter will operate on the decoded video signal from which it is derived. Suitable video delay lines are well known, are purchasable commercially, and are described, for example, on pages 35–45 in the book Electronics, by Elmore and Sands, published by the McGraw-Hill Book Company in 1949. Suitable differentiating circuits, or networks, are described and shown on pages 648 et seq. of the book Waveforms, by Chance et al., published in 1949 by the McGraw-Hill Book Company. The clipping portion of the network is well known, also being, for example, a biased diode which prevents signals in excess of a predetermined level from being applied to the pulse-stretcher network. These are shown in the above-noted book Waveforms on page 328, and are called there "diode selectors." The pulse-stretching networks 14, 20 are also known as pulse-lengthening networks, are also well known, and suitable arrangements are described in the above-noted book Electronics, on pp. 196 et seq. The amount of pulse-stretching required is determined by the requirements of the adders 22, 25, which is readily determined by applying single pulses to the input to the differentiate and clip network and observing the output of the adder until a proper addition is obtained. Adders 22, 25 of a suitable type are found described and shown on pages 629 et seq. of the above-noted book Waveforms. A circuit for a variable low-pass filter 26 of a suitable type, except for the component values, is shown and described in an article by Frank Rockett in the magazine Electronics for June 1947, page 142, published by the McGraw-Hill Book Company, and called "Background Noise Supressor." More recently, another suitable type of circuit is shown and described in the Proceedings of the I.R.E. for November 1955, published by the Institute of Radio Engineers, in an article entitled "Electronically Controlled Audio-Filters" by L. O. Dolansky. Though both these circuits are described for audio-frequency application, it is well within the ability of those skilled in the art to utilize these circuits for the required video frequencies by appropriate changes in the values and types of the circuit components.

Figure 1:
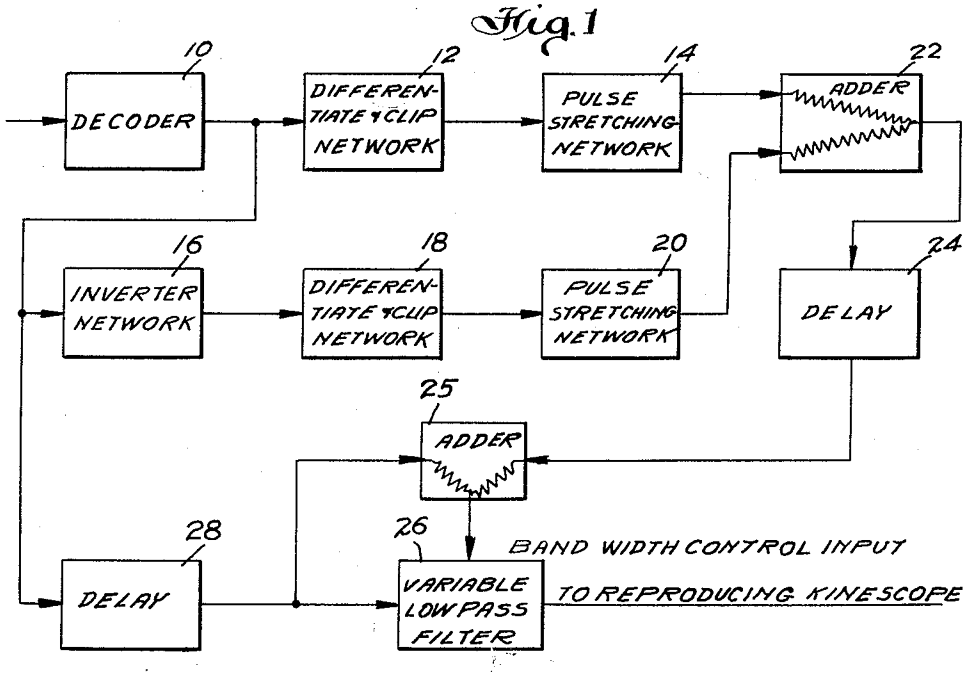
Figure 1 is a block diagram of an embodiment of the invention.
Figure 3:
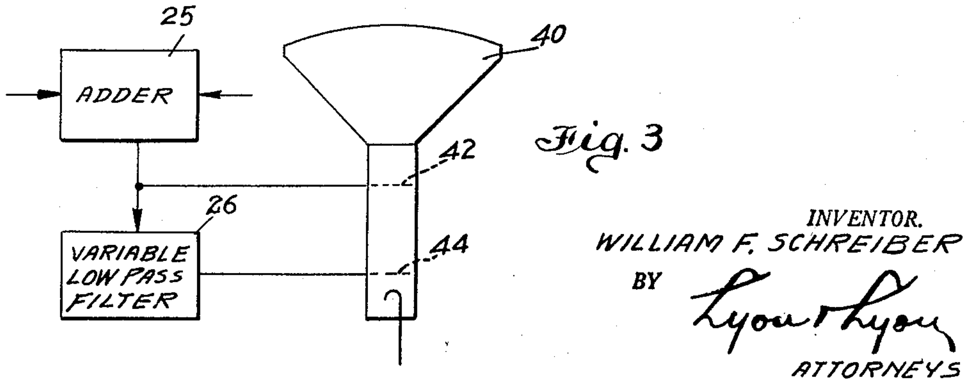
Figure 3 is a schematic diagram of a second embodiment of the invention.

Figure 3 shows another arrangement for interconnecting the embodiment of the invention into a receiver. Only so much of Figure 1 is shown as is required to illustrate this arrangement. Actually, all the apparatus shown in Figure 1 is also necessary. The reproducing kinescope 40 of the receiver is the type having a focus electrode 42. The control signal, which is the output of the adder 25, is applied to the focus electrode. The output of the variable low-pass filter is applied to the brightness grid of the kinescope.

In operation at low levels of control signal, the kinescope is defocused. This assists in minimizing spurious contours. Sharp focus is not required in regions of no change in brightness level, but only in the regions of change. Where there is a significant change in brightness level, the control signal will be large enough to provide the required focusing action. The conjunction of the defocusing operation, plus the prevention of small changes in brightness level of the video signal by operation of the variable low-pass filter, substantially eliminate spurious contours caused by noise or false brightness-level changes.

There has accordingly been described and shown hereinabove a novel and useful arrangement for eliminating spurious contours in a pulse-code-modulation system. It is to be noted that the arrangement of the embodiment of the invention also has application as a noise suppressor in the ordinary television system, since full television bandwidth is required only at the edges of objects, and full sharpness of the television kinescope is required only in the highlight areas. Consequently, the reduction of bandwidth caused by the embodiment of the invention, except where required, will have little effect on picture sharpness while at the same time reducing the noise in the blank areas of the picture. Of course, the input to the embodiment of the invention, when used as a noise suppressor in a regular television system, would be from the tube used to determine the brightness of the kinescope picture with the video signals.

I claim:

1. In a pulse-code-modulation television receiver for decoding and reproducing video signals received as quantized brightness-level steps, means for reducing spurious contours in the image reproduced as various brightness levels on a kinescope by said receiver, said spurious contours being caused by a change in quantized brightness-level steps, which is small relative to the change caused by a true contour, said spurious contour reducing means comprising means to derive a control signal from portions of said received decoded video signals representing said change in quantized brightness-level steps which is small, means to prevent said changes in brightness level of said decoded video signal representing said change in quantized brightness-level steps, which is small, from being reproduced on said kinescope, and means whereby said last-named means is made responsive to said control signal.

2. In a pulse-code-modulation television receiver for decoding and reproducing video signals received as quantized brightness-level steps, means for reducing spurious contours in the image reproduced as various brightness levels on a kinescope by said receiver, said spurious contours being caused by a change in quantized brightness-level steps which is small relative to the change caused by a true contour, said means for reducing spurious contours comprising means to derive a first control signal from decoded portions of said received video signals representing said change in brightness-level steps which is small, means to derive a second control signal from said decoded video signal when its brightness level is less than a level which is low relative to the highest brightness level, means to prevent said changes in brightness level representing said spurious contours from being sharply reproduced on said kinescope, and means whereby said last-named means is made responsive to said first and second control signals.

3. In a television receiver as recited in claim 2 wherein said means to prevent said changes in brightness level representing spurious contours from being reproduced includes means to defocus said kinescope responsive to said first and second control signals.

4. In a receiver for pulse-code-modulated television signals, means for reducing spurious contours in the image reproduced on a kinescope from decoded television signals which represent brightness levels of said image, which spurious contours are caused by brightness-level changes which are small compared to the brightness-level changes caused by true contours, said means for reducing spurious contours comprising means to derive first control signals responsive to changes in said decoded signals representing changes in brightness levels, means to generate second control signals responsive to said decoded television signals when its brightness level is less than a value which is low relative to the highest brightness level, means to prevent said brightness level changes which are small compared to brightness-level changes caused by true contours from being represented on said kinescope, and means whereby said last-named means is rendered responsive to said first and second control signals.

5. In a receiver for pulse-code-modulated television signals, means for reducing spurious contours in the image reproduced on a kinescope from decoded television signals representing brightness levels of said image, which spurious contours are caused by brightness-level changes which are small compared to brightness-level changes caused by true contours, said means for reducing contours comprising a low-pass filter having a variable cutoff frequency, means to apply said decoded television signals to said low-pass filter, means to depress the cutoff frequency of said low-pass filter, and means whereby said last-named means is made responsive to changes in said decoded television signals representing brightness level changes which are small compared to brightness-level changes caused by true contours.

6. In a receiver for pulse-code-modulated television signals, means for reducing spurious contours in the image reproduced on a kinescope from decoded television signals, which spurious contours are caused by changes in video-signal level which are small compared to changes caused by true contours, said means for reproducing spurious contours comprising a low-pass filter having a variable cutoff frequency, means to apply said decoded television signals to said low-pass filter, means to depress the cutoff frequency of said low-pass filter responsive to changes in levels of said decoded television signals on the order of said changes representing said spurious contours, means to depress the cutoff frequency of said low-pass filter, and means whereby said last-named means is rendered operative when the level of said decoded television signals is less than a value which is low relative to the highest brightness value.

7. In a receiver as recited in claim 6 wherein said means to depress the cutoff frequency of said low-pass filter responsive to changes in brightness levels being on the order of said changes representing said spurious contours includes first means to differentiate said demodulated television signals, first means to widen and clip the signal output from said first means to differentiate, means to invert said demodulated television signals, second means to differentiate the output of said means to invert, second means to widen and clip the signal output from said second means to differentiate, means to combine the outputs of said first and second means to widen and clip, and means to apply the output of said means to combine to said low-pass filter to control its variable cutoff frequency.

8. In a receiver for pulse-code-modulated television signals, means for reducing spurious contours in the image reproduced on a kinescope, having a focus-control electrode and a brightness-control grid, from decoded television signals said spurious contours being caused by changes in video-signal level which are small compared to changes caused by true contours, said means for reducing spurious contours comprising a low-pass filter having a variable cutoff frequency, means to apply said decoded television signals to said low-pass filter, first means to differentiate said demodulated television signals, first means to widen and clip the signal output from said first means to differentiate, means to invert said demodulated television signals, second means to differentiate the output of said means to invert, second means to widen and clip the signal output from said second means to differentiate, means to combine the outputs of said first and second means to widen and clip, means to apply the output of said means to combine and said decoded television signals to said low-pass filter to lower the cutoff frequency of said low-pass filter when the level of said decoded video signals has a value which is low relative to the highest level reproduced and the changes in level of said decoded television signals are on the order of said changes representing spurious contours, means to apply the output of said means to combine and said decoded television signals to the focus-control electrode of said kinescope to defocus said kinescope picture, and means to apply the output of said low-pass filter to said kinescope brightness-control grid.

References Cited in the file of this patent

UNITED STATES PATENTS 2,516,587 Peterson ............... July 25, 1950